US009948926B2

(12) United States Patent
Kang et al.

(10) Patent No.: US 9,948,926 B2
(45) Date of Patent: Apr. 17, 2018

(54) METHOD AND APPARATUS FOR CALIBRATING MULTIPLE CAMERAS USING MIRRORS

(71) Applicant: ELECTRONICS AND TELECOMMUNICATIONS RESEARCH INSTITUTE, Daejeon (KR)

(72) Inventors: Hyun Kang, Daejeon (KR); Jae-Hean Kim, Sejong (KR); Chang-Joon Park, Daejeon (KR); Jin-Sung Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 15 days.

(21) Appl. No.: 15/073,894

(22) Filed: Mar. 18, 2016

(65) Prior Publication Data

US 2016/0330437 A1 Nov. 10, 2016

(30) Foreign Application Priority Data

May 8, 2015 (KR) .................. 10-2015-0064575
Jan. 25, 2016 (KR) .................. 10-2016-0008879

(51) Int. Cl.
| | | |
|---|---|---|
| *H04N 5/247* | (2006.01) | |
| *H04N 17/00* | (2006.01) | |
| *G03B 43/00* | (2006.01) | |
| *G02B 17/00* | (2006.01) | |
| *G03B 43/02* | (2006.01) | |

(52) U.S. Cl.
CPC ......... *H04N 17/002* (2013.01); *G02B 17/004* (2013.01); *G03B 43/00* (2013.01); *G03B 43/02* (2013.01); *H04N 5/247* (2013.01)

(58) Field of Classification Search
CPC .... H04N 5/247; H04N 5/4403; H04N 17/002; G02B 17/004
See application file for complete search history.

(56) References Cited

U.S. PATENT DOCUMENTS

| | | | |
|---|---|---|---|
| 6,597,452 B1 * | 7/2003 | Jiang ................. | G01J 3/02 356/328 |
| 7,124,046 B2 | 10/2006 | Maeda et al. | |
| 7,321,839 B2 | 1/2008 | Maeda et al. | |
| 2003/0202691 A1 * | 10/2003 | Beardsley ........... | G06T 7/85 382/154 |

(Continued)

FOREIGN PATENT DOCUMENTS

KR 10-2013-0026741 A 3/2013

OTHER PUBLICATIONS

Zhengyou Zhang, "A Flexible New Technique for Camera Calibration," IEEE Transactions on Pattern Analysis and Machine Intelligence, vol. 22, No. 11, Nov. 2000.

*Primary Examiner* — Abdelaaziz Tissire
(74) *Attorney, Agent, or Firm* — LRK Patent Law Firm

(57) ABSTRACT

Method and apparatus for calibrating multiple cameras. A first mirror and a second mirror are arranged opposite each other. An object is disposed between the first mirror and the second mirror. Calibration of the multiple cameras is performed using a figure of the object formed on the second mirror via reflection from the first mirror and the second mirror.

20 Claims, 15 Drawing Sheets

(56) References Cited

U.S. PATENT DOCUMENTS

| | | | | |
|---|---|---|---|---|
| 2004/0141063 A1* | 7/2004 | Maeda | ............... | H04N 13/0246 |
| | | | | 348/207.99 |
| 2007/0005293 A1* | 1/2007 | Maeda | ............... | H04N 13/0246 |
| | | | | 702/152 |
| 2008/0231742 A1* | 9/2008 | Kurase | ................... | G03B 15/02 |
| | | | | 348/333.01 |
| 2013/0016223 A1* | 1/2013 | Kim | ..................... | H04N 17/002 |
| | | | | 348/187 |
| 2013/0044190 A1* | 2/2013 | Hu | .......................... | G06T 7/55 |
| | | | | 348/50 |
| 2013/0058526 A1* | 3/2013 | Kang | ....................... | G06T 7/80 |
| | | | | 382/103 |
| 2014/0112574 A1* | 4/2014 | Kim | ..................... | G06T 7/0018 |
| | | | | 382/154 |
| 2015/0015775 A1* | 1/2015 | Nagata | ................ | H04N 5/2351 |
| | | | | 348/370 |

\* cited by examiner

METHOD AND APPARATUS FOR CALIBRATING MULTIPLE CAMERAS USING MIRRORS

CROSS REFERENCE TO RELATED APPLICATIONS

This application claims the benefit of Korean Patent Application Nos. 10-2015-0064575, filed May 8, 2015 and 10-2016-0008879, filed Jan. 25, 2016, which are hereby incorporated by reference in their entirety into this application.

BACKGROUND OF THE INVENTION

1. Technical Field

The following embodiments generally relate to the calibration of multiple cameras and, more particularly, to a method and apparatus for calibrating multiple cameras using mirrors.

2. Description of the Related Art

With the fall in price of cameras and the improvement of computer performance and network performance, multiple cameras, rather than a single camera, have been used to construct a computer vision system.

Multiple cameras may be arranged to suit an actual vision application system, unlike image information from a single camera having a limited field (angle) of view, and a large amount of information may be acquired through the arrangement of the cameras.

However, a system that uses multiple cameras may entail a maintenance problem in proportion to the large amount of information that is acquired. In particular, the problem of camera calibration for detecting the position and posture of cameras increases the expense in proportion to the number of cameras.

Camera calibration includes a procedure for deriving intrinsic parameters and extrinsic parameters. Most computer vision systems that use cameras determine the place in which cameras are to be located and the direction that the cameras face, in the space designated by the designer of the corresponding computer vision system. In the case of multiple cameras, the positions and postures of all of the cameras are represented by the same coordinate system, and thus camera calibration is an essential process in image processing systems which use multiple cameras, such as in stereo imaging. In particular, it is expected that stereo cameras or multiple cameras are to be introduced in mobile phones or vehicles. In accordance with this expectation, manufacturing equipment for enabling camera manufacturers to calibrate multiple cameras is critically required.

As the number of calibration objects present in a calibration pattern increases, the accuracy of the results of a calibration algorithm is further improved. Most calibration programs automatically detect calibration objects, but require manual operations, such as the input of preliminary knowledge or the designation of a region of interest, as a precondition for the detection. Such manual operations need only to be performed once in the case of a single camera, but need to be performed several times in the case of multiple cameras, thus incurring a lot of expense.

In typical manufacturing processes, test equipment is limited as to the size and shape thereof. Test equipment is implemented in packages, for example, a package having a size and shape similar to a household refrigerator. The characteristics of the test equipment may improve the maintenance efficiency of the test equipment. In contrast, the vision system of stereo cameras is intended to identify objects located within a distance of about 10 m, with a baseline equal to the difference in position between the two eyes (binocular disparity). Here, the difference between the eyes may be about 6.5 cm. Therefore, the result of calibration by the vision system of stereo cameras may be trusted only when an image of a calibration object disposed at a representative location within a distance of about 10 m is captured and the result of the capturing is corrected.

In the manufacturing process, an apparatus for performing calibration of multiple cameras having a limited baseline must overcome the following restrictions:

1) The highest calibration quality must be derived via a smaller number of capturing operations.

2) To improve the ease of maintenance of the overall apparatus, lower components constituting the overall apparatus must be operated separately as far as possible.

3) The entire calibration process must be automated.

SUMMARY OF THE INVENTION

An embodiment is intended to provide a calibration apparatus and method that can be used in a manufacturing process for multiple cameras.

An embodiment is intended to provide a calibration apparatus and method that can provide high maintenance characteristics and can decrease installation expenses in a manufacturing process for multiple cameras.

An embodiment is intended to provide an apparatus and method that can secure high calibration quality using only a small number of capturing operations by exploiting mirrors and objects.

An embodiment is intended to reduce the volume of an apparatus required for capturing by exploiting mirrors, objects, and motion stages.

An embodiment is intended to provide an apparatus and method that use individually operated motion stages for mirrors, objects, and multiple cameras.

In accordance with an aspect, there is provided an apparatus for calibrating multiple cameras, including a first mirror; a second mirror arranged opposite the first mirror; and an object disposed between the first mirror and the second mirror, wherein multiple cameras are calibrated using a figure of the object formed on the second mirror via reflection from the first mirror and the second mirror.

The first mirror may be a reflection mirror.

The second mirror may be a reflection mirror.

The first mirror and the second mirror may be arranged parallel to each other.

The first mirror may have flatness equal to or greater than a predefined first threshold.

The second mirror may have flatness equal to or greater than a predefined second threshold.

The object may include a combination of a plurality of points having a relative geometric relationship therebetween.

The object has a plurality of faces.

On a part of the plurality of faces, a symbol enabling identification of the corresponding face may be indicated.

A part of the plurality of faces may correspond to a front face viewed in a direction of the first mirror A remaining part of the plurality of faces may correspond to a rear face viewed in a direction of the second mirror.

A pattern of points indicated on the front face may be identical to a pattern of points indicated on the rear face.

A character indicated on the front face may be different from a character indicated on the rear face.

Each of the front face and the rear face may include five or more surfaces.

The object may have a first shape viewed in a direction of the first mirror and a second shape viewed in a direction of the second mirror.

When a figure of the first shape and a figure of the second shape are repeatedly indicated in an image acquired when the multiple cameras capture the image of the second mirror, calibration of the multiple cameras may be applied using the figure of the first shape and the figure of the second shape.

Shapes in the image may be classified into the first shape and the second shape, thus enabling overlapping figures in the image to be distinguished from each other.

The multiple cameras may be arranged towards the second mirror.

A distance between the multiple cameras and the object, suitable for a purpose of use of the multiple cameras, may be simulated using a distance between the first mirror and the second mirror and a distance between the second mirror, the object, and the multiple cameras.

Calibration of the multiple cameras may be performed using a region of interest in an image captured by the multiple cameras.

The region of interest may be a region, brightness of which is equal to or greater than a predefined level, in the captured image.

The apparatus may further include a light source for adjusting a size of the region of interest by adjusting an amount of emitted light.

The apparatus may further include a first mirror motion stage configured to adjust a position of the first mirror; a second mirror motion stage configured to adjust a position of the second mirror; an object motion stage configured to adjust a position of the object; and a multiple-camera motion stage configured to adjust a position of the multiple cameras.

In accordance with another aspect, there is provided a method for calibrating multiple cameras, including setting up an environment for calibration of multiple cameras, capturing an image of a second mirror using the multiple cameras, thus generating the image; acquiring information for calibration of the multiple cameras using the image; and performing calibration of the multiple cameras using the acquired information, wherein a first mirror and the second mirror are arranged opposite each other, and wherein the image indicates a figure of an object formed on the second mirror via reflection from the first mirror and the second mirror.

In accordance with a further aspect, there is provided a method for calibrating multiple cameras, the method being performed by multiple cameras disposed between a first mirror and a second mirror, the method including capturing an image of the second mirror, thus generating the image; acquiring information for calibration using the image, and performing calibration using the acquired information, wherein the first mirror and the second mirror are arranged opposite each other, and wherein the image indicates a figure of an object formed on the second mirror via reflection from the first mirror and the second mirror.

In addition, other methods, apparatuses, and systems for implementing the present invention, and a computer-readable storage medium storing a computer program for executing the method, are further provided.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
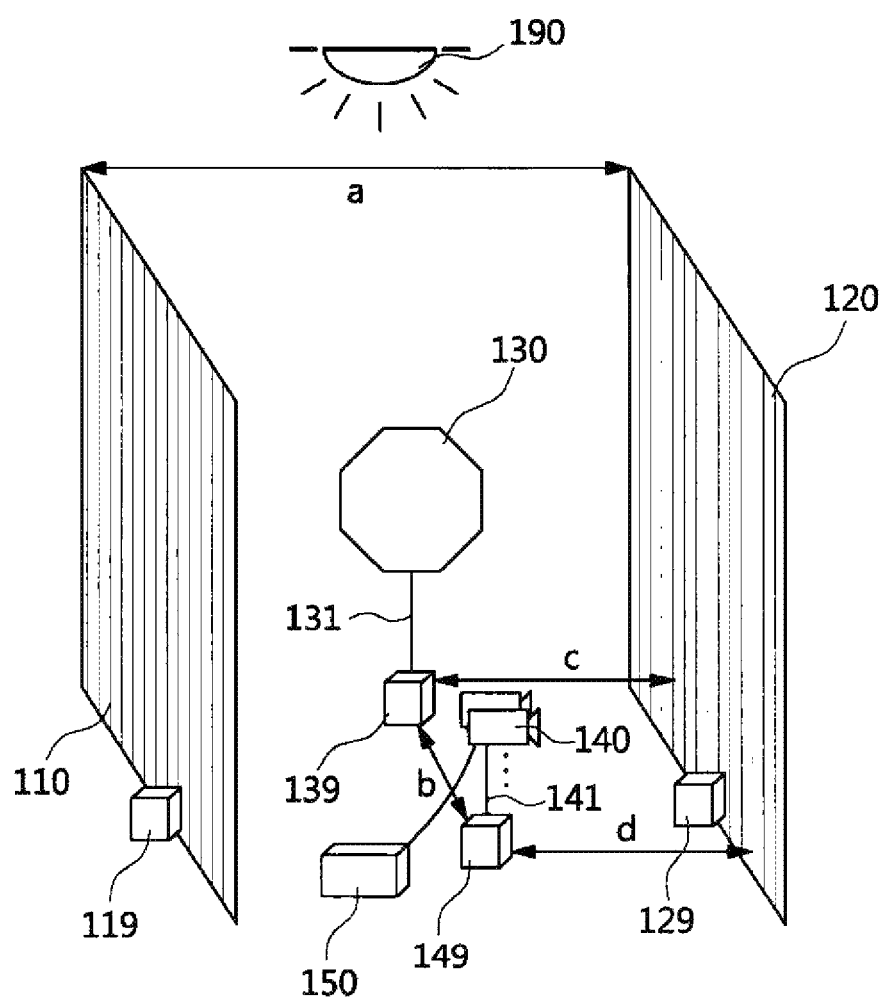
FIG. 1 is a diagram showing an apparatus for calibrating multiple cameras according to an embodiment.

Detailed description of the following exemplary embodiments will be made with reference to the attached drawings illustrating specific embodiments. These embodiments are described so that those having ordinary knowledge in the technical field to which the present disclosure pertains can easily practice the embodiments. It should be noted that various embodiments are different from each other, but do not need to be mutually exclusive to each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

The terms used herein are for the purpose of describing particular embodiments only and are not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element, or intervening elements may be present.

Terms such as 'first' and 'second' may be used to describe various elements, but the elements are not restricted by the terms. The terms are used only to distinguish one element from the other element. For example, a first element may be named a second element without departing from the scope of the present invention. Likewise, a second element may be named a first element.

Also, element modules described in the embodiments of the present invention are independently shown in order to indicate different characteristic functions, and but this does not mean that each of the element modules is formed of a separate piece of hardware or software. That is, element modules are arranged and included, for convenience of description, and at least two of the element units may form one element unit or one element may be divided into multiple element units and the multiple element units may perform functions. An embodiment into which the elements are integrated or an embodiment from which some elements are separated is included in the scope of the present invention as long as it does not depart from the essence of the present invention.

Further, in the present invention, some elements are not essential elements for performing essential functions, but may be optional elements for improving only performance. The present invention may be implemented using only essential elements for implementing the essence of the present invention, excluding elements used to improve only performance, and a structure including only essential elements, excluding optional elements used only to improve performance, is included in the scope of the present invention.

Embodiments of the present invention are described with reference to the accompanying drawings in order to describe the present invention in detail so that those having ordinary knowledge in the technical field to which the present invention pertains can easily practice the present invention. In the following description of the present invention, detailed descriptions of known functions and configurations which are deemed to make the gist of the present invention obscure will be omitted.

FIG. 1 illustrates an apparatus for calibrating multiple cameras according to an embodiment.

An apparatus 100 for calibrating multiple cameras may include at least some of a first mirror 110, a first mirror motion stage 119, a second mirror 120, a second mirror motion stage 129, an object 130, an object holder 131, an object motion stage 139, multiple cameras 140, a multiple-camera holder 141, a multiple-camera motion stage 149, a processing unit 150, and a light source 190.

The first mirror 110 and the second mirror 120 may be arranged parallel to each other. The second mirror 120 may be arranged opposite the first mirror. As shown in FIG. 1, the first mirror may be a front surface mirror. The second mirror may be a rear surface mirror. Alternatively, the first mirror may be a rear surface mirror, and the second mirror may be a front surface mirror.

The first mirror 110 may be a reflection mirror. The second mirror 120 may be a reflection mirror. As shown in FIG. 1, "a" may denote the distance between the first mirror 110 and the second mirror 120.

The flatness of the first mirror 110 may be equal to or greater than a predefined first threshold. The flatness of the second mirror 120 may be equal to or greater than a predefined second threshold.

The object 130 may be a subject to be captured by the multiple cameras 140.

The object 130 may include a combination of a plurality of points having relative geometric relationships therebetween. The plurality of points may have two or more surface relationships. Alternatively, the object 130 may include two or more three dimensional (3D) points having predefined positions.

The object 130 may have a plurality of faces. For example, the object 130 may include a front face, reflected in the first mirror 110, and a rear face, reflected in the second mirror 120.

The object 130 may include patterns. For example, a pattern may be indicated on each of the plurality of faces of the object 130.

The object 130 may be disposed between the first mirror 110 and the second mirror 120. In FIG. 1, "c" may denote the distance between the second mirror 120 and the object 130.

The first mirror 110 and the second mirror 120 are opposite each other, and thus figures of the object 130 may be formed on the first mirror 110 via reflection from the first mirror 110 and the second mirror 120. There are countless figures of the object 130 formed on the first mirror 110. Also, the figures of the object 130 may be formed on the second mirror 120 via reflection from the first mirror 110 and the second mirror 120. There are countless figures of the object 130 formed on the second mirror 120. In other words, since the first mirror 110 and the second mirror 120 are opposite each other, the object 130 may have countless mirror figures on the first mirror 110 and the second mirror 120.

Further, the distances between the figures may be different from each other, and the differences between the distances may also be reflected in the image captured by the multiple cameras 140.

The multiple cameras 140 may be a set including a plurality of cameras. For example, the multiple cameras 140 may be either stereo cameras or a camera array. The multiple cameras 140 may be targets to be calibrated.

The multiple cameras 140 may be disposed between the first mirror 110 and the second mirror 120. The multiple cameras 140 may be arranged towards the second mirror 120. As shown in FIG. 1, "b" may denote the distance between the object 130 and the multiple cameras 140. "d" may denote the distance between the multiple cameras 140 and the second mirror 120.

The object holder 131 may be used to adjust the height of the object 130. The object holder 131 may be used to adjust the height of the object 130 so that the figure of the object 130 is suitably formed on the first mirror 110 and the second mirror 120.

The multiple-camera holder 141 may be used to adjust the height of the multiple cameras 140. The multiple-camera holder 141 may be used to adjust the height of the multiple cameras 140 so that figures of the multiple cameras 140 formed on the first mirror 110 and/or the second mirror 120 are suitably captured.

According to the purpose of use of the multiple cameras 140, a principal target to be recognized by the multiple cameras 140 may be a short-distance object, a middle distance object or an object located at a specific distance. The distance between the multiple cameras 140 and the object 130, which serves the use purpose of the multiple cameras 140, may be simulated using the distance between the first mirror 110 and the second mirror 120 and the distances between the second mirror 120, the object 130, and the multiple cameras 140.

The apparatus 100 for calibrating multiple cameras may include at least some of the first mirror 110, the first mirror motion stage 119, the second mirror 120, the second mirror motion stage 129, the object 130, the object holder 131, the object motion stage 139, the multiple cameras 140, the multiple-camera holder 141, and the multiple-camera motion stage 149.

The first mirror motion stage 119 may adjust the position of the first mirror 110. The second mirror motion stage 129 may adjust the position of the second mirror 120. The object motion stage 139 may adjust the position of the object 130. The multiple-camera motion stage 149 may adjust the position of the multiple cameras 140.

Each of the first mirror motion stage 119, the second mirror motion stage 129, the object motion stage 139, and the multiple-camera motion stage 149 may include a movable motor or jig. Each of the first mirror motion stage 119, the second mirror motion stage 129, the object motion stage 139, and the multiple-camera motion stage 149 may be moved through the movable motor or jig.

Each of the first mirror motion stage 119, the second mirror motion stage 129, the object motion stage 139, and the multiple-camera motion stage 149 may have a structure enabling movement relative to six axes. The six axes may include three axes for movement and three axes for rotation.

A program for each of the first mirror motion stage 119, the second mirror motion stage 129, the object motion stage 139, and the multiple-camera motion stage 149 may record an angular motion direction and movement. Further, the program for each of the first mirror motion stage 119, the second mirror motion stage 129, the object motion stage 139, and the multiple-camera motion stage 149 may reproduce the recorded angular motion direction and the recorded movement. By the first mirror motion stage 119, the second mirror motion stage 129, the object motion stage 139, and the multiple-camera motion stage 149, various scenes of the apparatus 100 for calibrating the multiple cameras may be produced.

By means of reflection from the first mirror 110 and the second mirror 120, the calibration of the multiple cameras 140 may be performed using the figures of the object 130 formed on the second mirror 120. The calibration of the multiple cameras 140 may be performed either by the multiple cameras 140 or by the external processing unit 150. For example, the figures of the object 130 formed on the second mirror 120 may be represented in the image captured by the multiple cameras 140. The multiple cameras 140 may be calibrated using the figures of the object 130 formed on the second mirror 120. Alternatively, the processing unit 150 may acquire the image captured by the multiple cameras 140 and may calibrate the multiple cameras 140 using the figures of the object 130, formed on the second mirror 120, in the image.

The light source 190 may allow adjustment of the intensity of light emitted from the light source 190. Via the light source 190, the brightness of lighting of the apparatus 100 for calibrating the multiple cameras may be adjusted.

Figure 2:
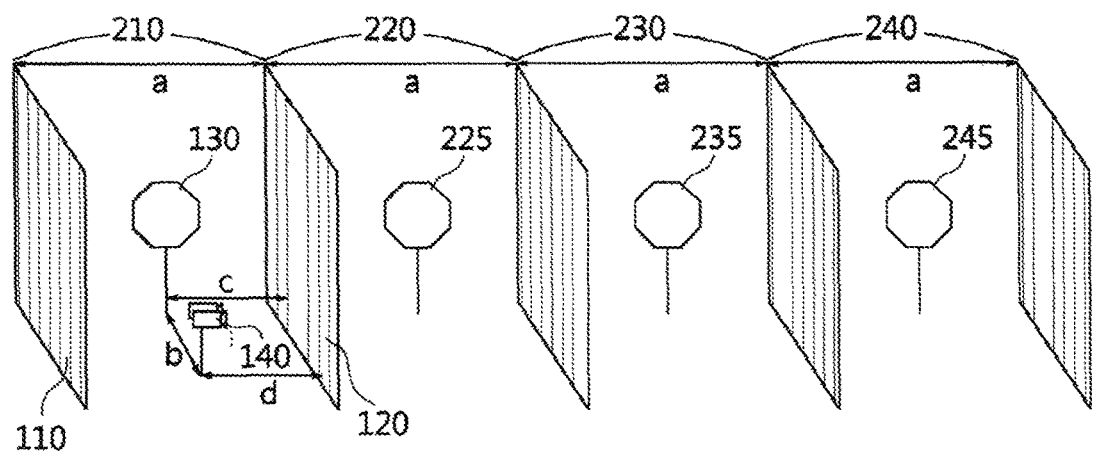
FIG. 2 shows the reflection of an object from mirrors according to an embodiment.

FIG. 2 shows the reflection of an object from mirrors according to an embodiment.

When the first mirror 110 and the second mirror 120 are parallel to each other, and the flatness values of the first mirror 110 and the second mirror 120 are equal to or greater than a threshold value, and the first mirror 110 and the second mirror 120 are total-reflection mirrors for reflecting light in all wavelength bands, figures of the object 130 formed on the second mirror 120 may be indicated, as shown in FIG. 2.

In accordance with the viewpoints of the multiple cameras 140 which face the second mirror 120, it may be assumed that, by means of the first mirror 110 and the second mirror 120 which are parallel to each other, virtual regions 220, 230, and 240 are consecutively disposed beside an actual region 210 between the first mirror 110 and second mirror 120. In FIG. 2, the three virtual regions 220, 230, and 240 are depicted.

In the virtual regions 220, 230, and 240, images 225, 235, and 245, appearing when the object 130 is reflected from the first mirror 110 and the second mirror 120, are indicated, respectively.

The first image 225 may be a figure generated as the object 130 is reflected from the second mirror 120. The second image 235 may be a figure generated as the figure, generated when the object 130 is reflected from the first mirror 110, is reflected again from the second mirror 120. The third image 245 may be a figure generated as the object 130 is sequentially reflected from the second mirror 120, the first mirror 110, and the second mirror 120.

Therefore, the distance between the first image 225 and the multiple cameras 140 may be "c+d". The distance between the second image 235 and the multiple cameras 140 may be "(a−c)+a+d". The distance between the third image 245 and the multiple cameras 140 may be "c+a+a+d".

Figure 3:
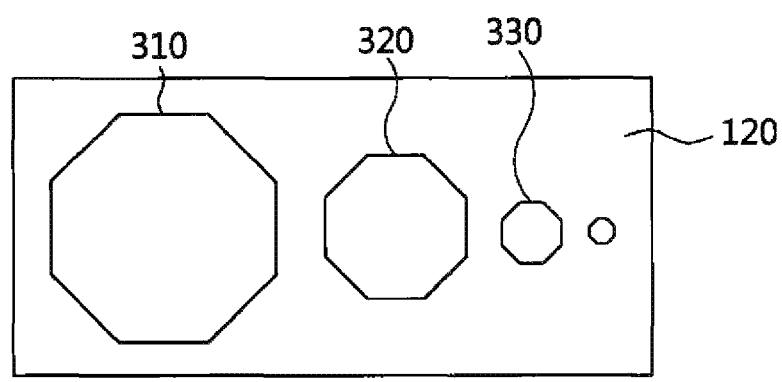
FIG. 3 illustrates figures of an object formed on a second mirror depending on viewpoints of multiple cameras according to an embodiment.

FIG. 3 illustrates figures of an object formed on the second mirror depending on the viewpoints of the multiple cameras according to an embodiment.

In FIG. 3, a first image 310 may denote a first image 225 reflected in the second mirror 120. A second image 320 may denote a second image 235 reflected in the second mirror 120. A third image 330 may denote a third image 245 reflected in the second mirror 120.

By means of the above-described configuration, even if the actual distance 'a' between the first mirror 110 and the second mirror 120 is not large, subjects having an area of a large width may be generated. Therefore, the multiple cameras 140 may acquire results in various environments using only a small number of capturing operations, and may efficiently perform calibration of the multiple cameras 140.

Figure 4:
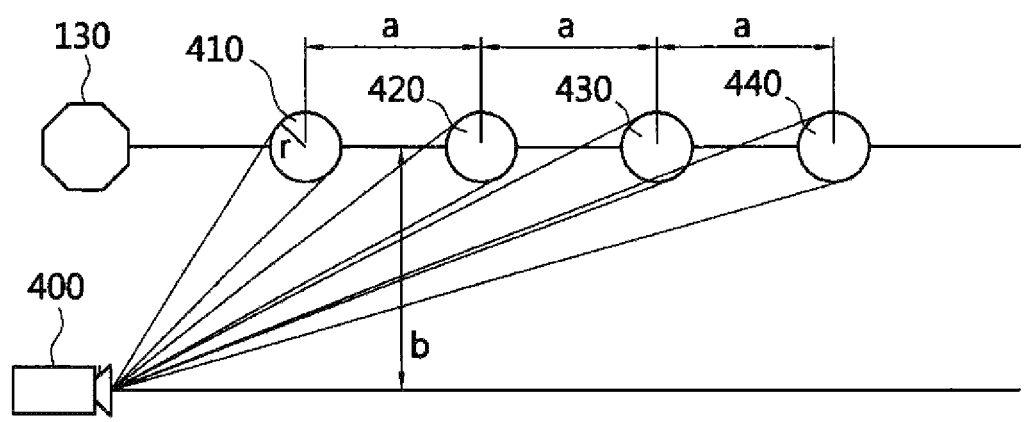
FIG. 4 shows a problem to be taken into consideration in the apparatus for calibrating multiple cameras according to an embodiment.

FIG. 4 shows the problems to be taken into consideration in the apparatus for calibrating multiple cameras according to an embodiment.

The apparatus 100 for calibrating multiple cameras may have the following problems:
1. Overlapping problem
2. Separation problem
3. Lighting problem The overlapping problem may mean, for example, the situation shown in FIG. 2, in which the first image 225 may hide the second image 235 and the third image 245.

In relation to the overlapping problem, the detailed situation is shown in FIG. 4.

The pattern of the object 130 may generate mirror images 410, 420, 430, and 440.

When the generated mirror images 410, 420, 430, and 440 are simplified without losing generality, the mirror images 410, 420, 430, and 440 may be assumed to be spheres having a radius of r. In FIG. 4, mirror images 410, 420, 430, and 440, which are assumed to be spheres, are depicted.

The mirror images 410, 420, 430, and 440 may be generated in a line while being spaced apart from each other by a distance of "a" due to the first mirror 110 and the second mirror 120 which are arranged parallel to each other.

Through image processing performed by a camera 400, an imaging procedure on the spheres may be represented by straight lines from the outer points of the spheres to the center of the camera 400. The camera 400 may be one of the multiple cameras 140.

As shown in FIG. 4, a sphere corresponding to the first mirror image 410 and a sphere corresponding to the second mirror image 420 may be displayed as separate shapes even in the image of the camera 400. However, the sphere corresponding of the second mirror image 420 and a sphere corresponding to the third mirror image 430 may be seen as consecutively appearing shapes. Further, the sphere corresponding to the third mirror image 430 and a sphere corresponding to the fourth mirror image 440 may overlap each other. In other words, part of the sphere of the fourth mirror image 440 may be hidden by the sphere of the third mirror image 430.

To minimize such overlap, the interval 'a' between the first mirror 110 and the second mirror 120 must be increased, the interval 'b' between the camera 400 and the object 130 must be increased, or the radius 'r' of the object 130 must be decreased.

However, the intervals 'a' and 'b' may be factors which determine the effective size of the apparatus 100 for calibrating multiple cameras. Therefore, the adjustment of the intervals 'a' and 'b' may be restricted, and suitable intervals 'a' and 'b' may be determined according to the usage scenario of the cameras or the like.

Figure 5:
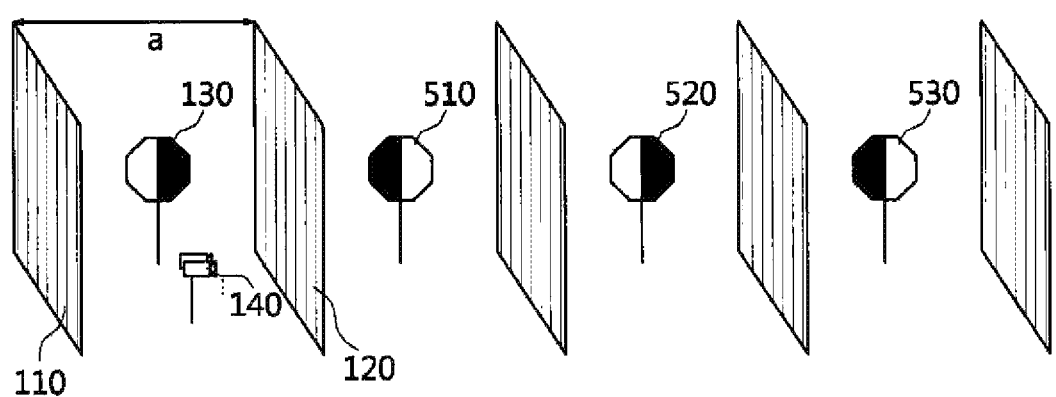
FIG. 5 shows a separation problem and the solution of the separation problem according to an embodiment.

FIG. 5 shows a separation problem and the solution thereof according to an embodiment.

From the standpoint of the multiple cameras 140, the separation problem may mean that objects having a similar shape appear at several positions in an image acquired by capturing.

In order to identify all of the objects and extract the feature values of required objects, various techniques must be used.

As described above, the object 130 may have a plurality of faces. The shapes of the faces may differ from each other. The different shapes of the faces enable the plurality of faces to be identified from the image acquired by the capturing of the multiple cameras 140.

For example, colors of at least some of the plurality of faces may be different from each other. In at least some of the plurality of faces, different symbols may be indicated. In at least some of the plurality of faces, different numbers of symbols may be indicated. In at least some of the plurality of faces, the contours thereof may be different from each other.

Further, in at least some of the plurality of faces, symbols enabling the identification of the faces may be indicated. For example, when the object 130 has two or more faces, a symbol for extracting the number of the corresponding face may be written on each of the two or more faces.

However, the shape of the symbol appearing in the captured image may change depending on the number of reflections of the symbol from the first mirror 110 and the second mirror 120. An example of this phenomenon may be illustrated in FIG. 5.

As shown in FIG. 5, the object 130 may include a first shape, viewed in the direction of the first mirror 110, and a second shape, viewed in the direction of the second mirror 120. The first shape may be a pattern or a character that is viewed in the direction of the first mirror 110 and is not viewed in the direction of the second mirror 120. The second shape may be a pattern or a character that is viewed in the direction of the second mirror 120 and is not viewed in the direction of the first mirror 110. In FIG. 5, the first shape is indicated in white, and the second shape is indicated in black.

Figure 6:
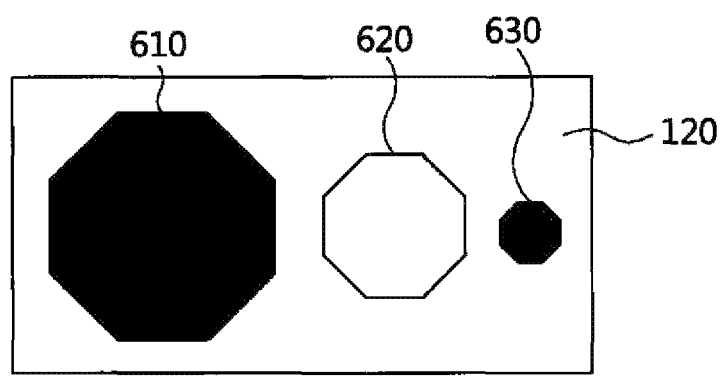
FIG. 6 shows figures in an image acquired when multiple cameras capture a second mirror.

The first and second shapes may form their own images while changing to reversed shapes whenever they are reflected from the first mirror 110 and the second mirror 120. In FIG. 6, figures having the first shape and figures having the second shape in an image acquired as the multiple cameras 140 capture the image of the second mirror 120 will be described.

FIG. 6 shows figures in an image acquired when multiple cameras capture the image of the second mirror.

In FIG. 6, a first image 610 may indicate a second shape figure of the object 130, which is reflected in the second mirror 120. A second image 620 may indicate a first shape figure of the object 130, which is sequentially reflected in the first mirror 110 and the second mirror 120. The third image 630 may indicate a second shape figure of the object 130 sequentially reflected in the second mirror 120, the first mirror 110, and the second mirror 120.

The multiple cameras 140 may acquire the image of FIG. 6 by capturing the image of the second mirror 120.

As shown in FIG. 6, in the acquired image, the symbol of the object 130 may be indicated while a reversed figure and a true figure are repeated depending on the number of reflections from the first mirror 110 and the second mirror 120. The calibration of the multiple cameras 140 may be applied by utilizing a reversed figure and a true figure, which are repeatedly indicated.

Further, in the acquired image, the figure of the first shape and the figure of the second shape may be repeatedly indicated depending on the number of reflections from the first mirror 110 and the second mirror 120. When the figure of the first shape and the figure of the second shape are repeatedly indicated, the calibration of the multiple cameras 140 may be applied using the figure of the first shape and the figure of the second shape. The processing unit 150 may perform the calibration of the multiple cameras 140 using the figure of the first shape and the figure of the second shape, which are repeatedly indicated in the acquired image.

Furthermore, the above-described properties may be applied in order to overcome the separation problem.

Processing required to overcome the separation problem may be performed by distinguishing the case where a character is indicated as a reversed figure from the case where a character is indicated as a true figure, with respect to symbols in the acquired image. The processing unit 150 may perform processing required to overcome the separation problem by distinguishing the case where a character is indicated as a reversed figure from the case where a character is indicated as a true figure, with respect to symbols in the acquired image. For example, the processing unit 150 may identify overlapping figures in the image by distinguishing the case where a character is indicated as a reversed figure from the case where a character is indicated as a true figure, with respect to symbols in the acquired image.

Alternatively, processing required to overcome the separation problem may be performed by classifying shapes in the acquired image into a first shape and a second shape. The processing unit 150 may perform processing required to overcome the separation problem by classifying the shapes in the acquired image into a first shape and a second shape. For example, the processing unit 150 may identify overlapping figures in the image by classifying the shapes in the acquired image into a first shape and a second shape.

Figure 7:
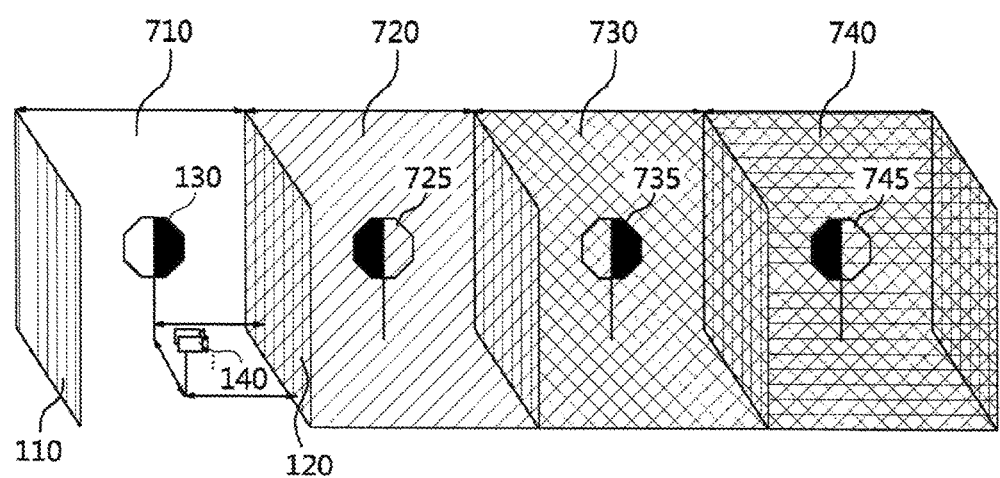
FIG. 7 shows the problem of a decrease in the brightness of images, which occurs when a first mirror or a second mirror is not a total-reflection mirror according to an embodiment.

FIG. 7 shows the problem of a decrease in the brightness of an image, which occurs when the first mirror or the second mirror is not a total-reflection mirror according to an embodiment.

When the first mirror 110 and/or the second mirror 120 are not total-reflection mirrors, part of light may be absorbed by the first mirror 110 and/or the second mirror 120 whenever the light is reflected from the first mirror 110 and/or the second mirror 120. By means of this absorption, the light intensity of the entire image may be decreased, and the entire image may be darkened.

In FIG. 7, a (virtual) second region 720, located beside an actual first region 710 between the first mirror 110 and the second mirror 120, is shown to be darker than the first region 710. Further, a third region 730, located beside the second region 720, is shown to be darker than the second region 720. Furthermore, a fourth region 740, located beside the third region 730, is shown to be darker than the third region 730.

When the first mirror 110 and the second mirror 120 are total-reflection mirrors, light may be preserved by minimizing the absorption rate of light. However, a phenomenon occurring due to the absorption of light may also be used to solve the separation problem.

When countless figures are generated due to the reflection from the first mirror 110 and the second mirror 120, the distances to the figures may also be infinite, and the sizes of feature points in the figures may also be reduced to a meaningless level. Since feature points having sizes that are less than or equal to a predefined size may be useless, the number of times that the figures are repeated may also be adjusted.

In other words, depending on the number of reflections from the first mirror 110 and the second mirror 120, the intensity of light in the entire image may be sequentially decreased in the direction from the second region 720 to the third region 730 and the fourth region 740. Further, the brightness values of the first image 725, the second image 735, and the third image 745 may be sequentially decreased.

Such a decrease may be due to the absorption of light by the first mirror 110 and the second mirror 120. For example, when a reflection mirror having a reflexibility of 80% is used, 20% of the amount of light may be absorbed whenever reflection is performed once, and the absorbed amount of light may disappear. Therefore, only about 50% of the original light may remain even if reflection is performed only three times (100*0.8*0.8*0.8=51.2).

The method for solving the separate problem using the intensity of light will be described in detail below with reference to FIG. 8.

Figure 8:
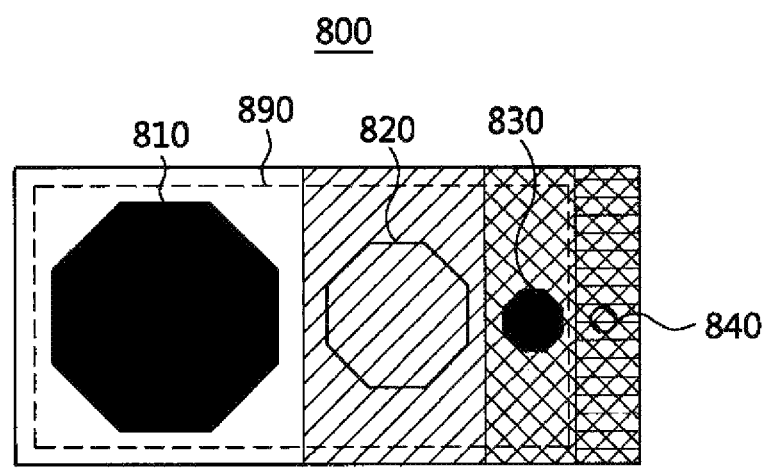
FIG. 8 illustrates images acquired by multiple cameras when a first mirror or a second mirror is not a total-reflection mirror according to an embodiment.

FIG. 8 illustrates an image acquired by multiple cameras when a first mirror or a second mirror is not a total-reflection mirror according to an embodiment.

In an entire image 800 acquired by the multiple cameras 140, a first image 810, a second image 820, a third image 830, and a fourth image 840, which indicate the figures of FIG. 7, respectively, are depicted. As shown in FIG. 8, the images and their backgrounds may be darkened in a direction from the left to the right.

Depending on this phenomenon, as indicated in the image 800, the third image 830 and the fourth image 840 may be separated.

Brightness that has been decreased from the left to the right may be a basis for separating the third image 830 from the fourth image 840.

The processing unit 150 may set a region satisfying a predefined condition in an image, acquired when the multiple cameras 140 capture the image of the second mirror, as a Region Of Interest (ROI) 890. The processing unit 150 may calibrate the multiple cameras 140 using the ROI 890 in the image captured by the multiple cameras 140.

The ROI 890 may be a region, the brightness of which is equal to or greater than a predetermined level, in the captured image. The processing unit 150 may adjust the amount of light emitted from the light source 190. The light source 190 may adjust the brightness of the captured image and the size of the ROI 890 by adjusting the amount of emitted light.

For example, in FIG. 8, the ROI 890 may be a region having a brightness of 50% or more. When the ROI 890 is the region having a brightness of 50% or more, the figure of the image 840 may be excluded from information used for calibration of the multiple cameras 140.

Figure 9A:
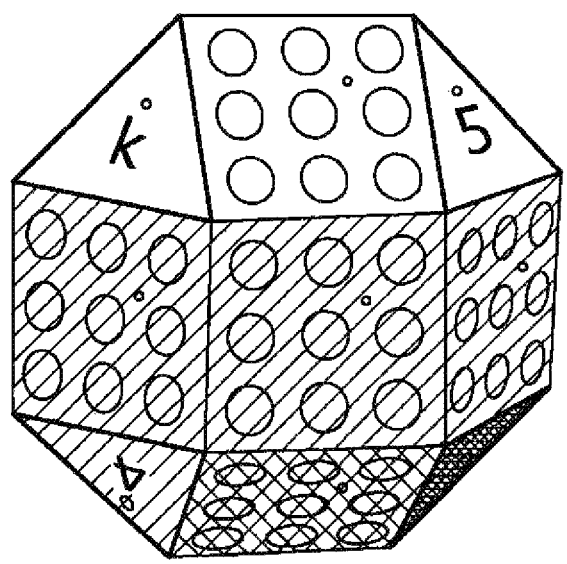
FIG. 9A illustrates the structure of an object according to an embodiment.

FIG. 9A illustrates the structure of an object according to an embodiment.

The object 130 may be a combination of a plurality of points having a relative geometrical relationship therebetween. As described above in relation to the overlapping problem, the radius r of the object 130 must be equal to or greater than a predefined minimum value. Further, the object 130 must provide a set of symbols for solving the separation problem.

As shown in FIG. 9A, the object 130 may have a plurality of faces, wherein a symbol, a character and/or a picture enabling the identification of the faces may be indicated on respective faces corresponding to multiple sides. The object 130 may be divided into a front face and a rear face, which will be described below with reference to FIGS. 9B and 9C.

Figure 9B:
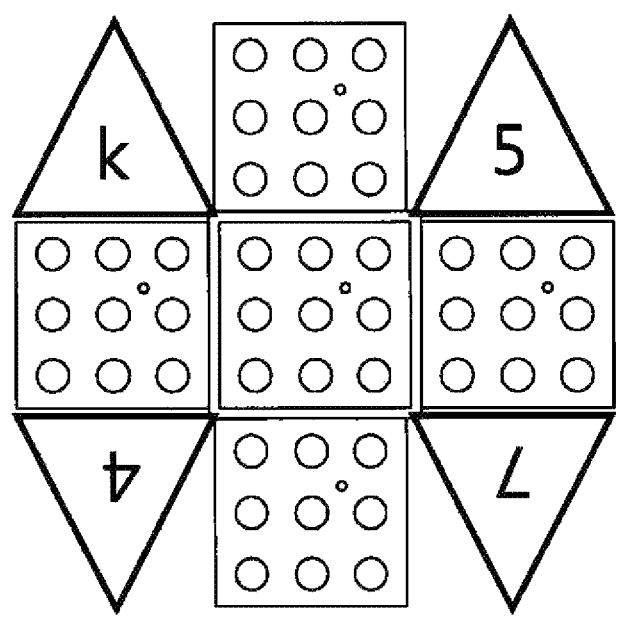
FIG. 9B illustrates the front face of the object according to an embodiment.

FIG. 9B illustrates the front face of the object according to an embodiment.

Some of the plurality of faces of the object 130 may be a front face viewed only in the direction of the first mirror 110. The object 130 may have five or more faces in which combinations of points are indicated.

On the front face, patterns of points and characters may be indicated. On some of a plurality of surfaces constituting the front face, patterns of points may be indicated, and on the remaining surfaces of the plurality of surfaces constituting the front face, characters may be indicated.

Figure 9C:
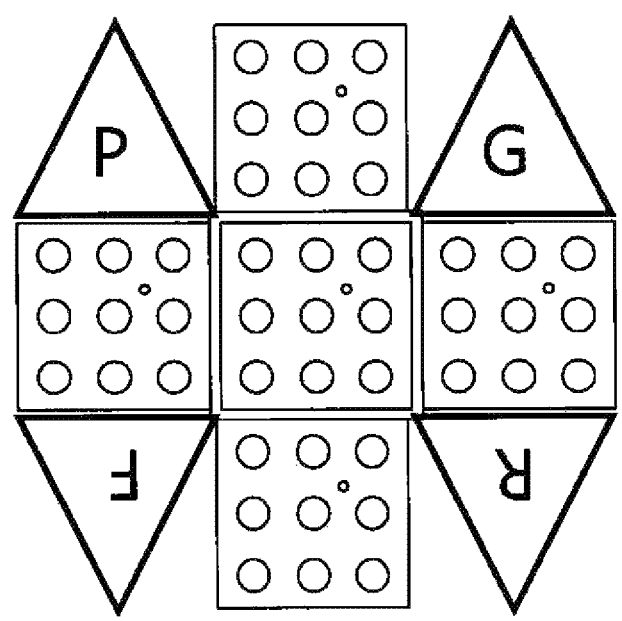
FIG. 9C illustrates the rear face of the object according to an embodiment.

FIG. 9C illustrates the rear face of the object according to an embodiment.

The remainder of a plurality of faces of the object 130 may be a rear face viewed only in the direction of the second mirror 120. The object 130 may have five or more faces on which combinations of points are indicated.

On the rear face, patterns of points and characters may be indicated. On some of a plurality of surfaces constituting the rear face, patterns of points may be indicated, and on the remaining surfaces of the plurality of surfaces constituting the rear face, characters may be indicated.

As shown in FIGS. 9B and 9C, the patterns of points indicated on the front face and the patterns of points indicated on the rear face may be identical to each other. The characters indicated on the rear face and the front face may be different from each other.

When the object 130 has a plurality of faces, the number of capturing operations required for the calibration of the multiple cameras 140 may be decreased in inverse proportion to the number of faces of the object 130.

Since each of the front face and the rear face may have five or more surfaces, the calibration of the multiple cameras 140 may be performed using the image acquired via one capturing operation of the multiple cameras 140 using a known image recognition algorithm and camera calibration.

Figure 10:
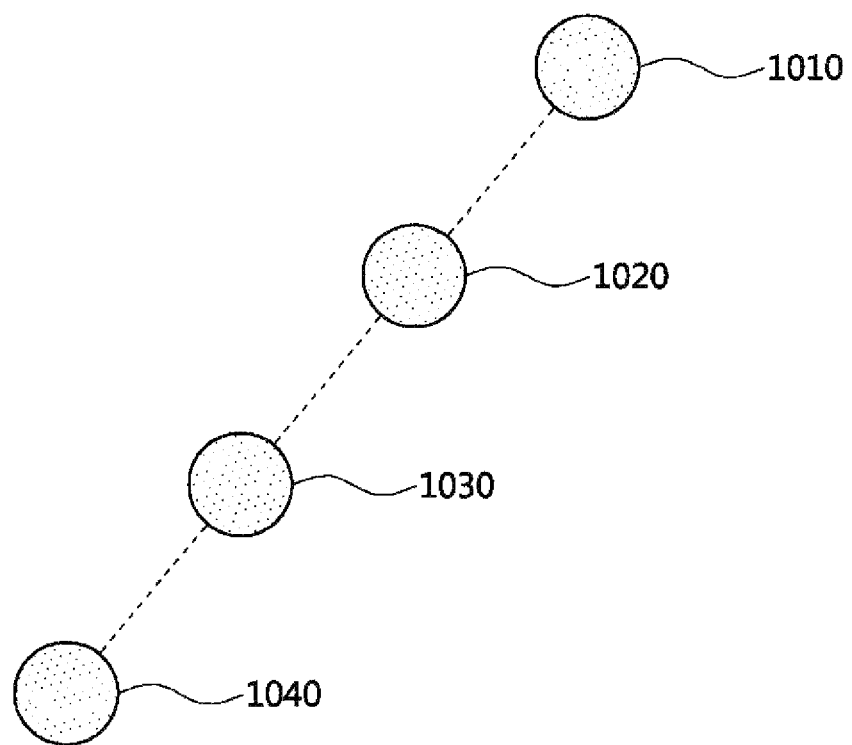
FIG. 10 illustrates the structure of an object according to an embodiment.

FIG. 10 illustrates the structure of the object according to an embodiment.

The object 130 may include a plurality of spheres. FIG. 10 illustrates a first sphere 1010, a second sphere 1020, a third sphere 1030, and a fourth sphere 1040 as the plurality of spheres.

3D positions of the plurality of spheres may be different from each other. The spheres may be disposed in a straight line in 3D space. For example, the number of spheres may be four or more. Each of the spheres may have a small size to such an extent that the radius thereof is less than or equal to a predefined threshold value.

The plurality of spheres disposed in a straight line may have geometric properties such as a cross ratio. The cross ratio may be maintained even in projective transformation. Therefore, when an image is captured by the multiple cameras 140, the cross ratio may be an important key in separating four points in the image. In other words, when four or more points are disposed in a straight line, relationships between the points may be maintained without change even in an image taken as a picture. In contrast, in an image obtained by taking a picture of parallel lines, such as roads, the parallel lines may be seen as two lines intersecting at a single point.

Small spheres may form an infinite number of figures via reflection from the first mirror 110 and the second mirror 120. In other words, the small spheres may form feature points distributed at various locations and various distances without overlapping each other in the image captured by the multiple cameras 140.

The processing unit 150 may detect the positions of a plurality of spheres in the image captured by the multiple cameras 140 only using a simple algorithm. The processing unit 150 may calibrate the multiple cameras 140 using the detected positions of the spheres.

Each of the spheres may include a light-emitting unit. The light-emitting unit may be arranged within the corresponding sphere. Further, a light-emitting element itself may be used as the sphere.

Figure 11A:
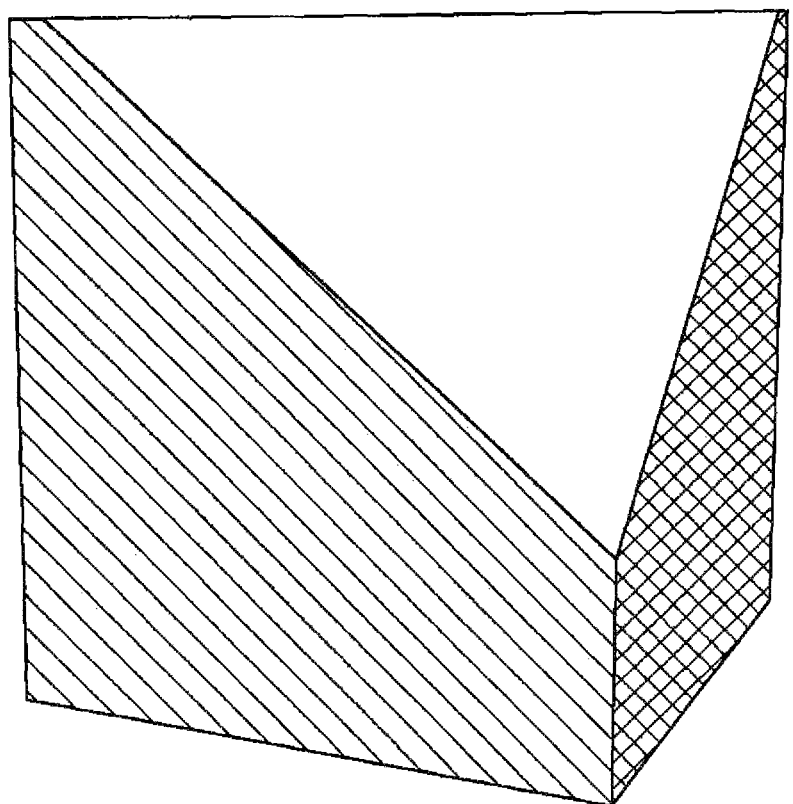
FIG. 11A illustrates a hexahedral object according to an embodiment.

FIG. 11A illustrates a hexahedral object according to an embodiment.

Figure 11B:
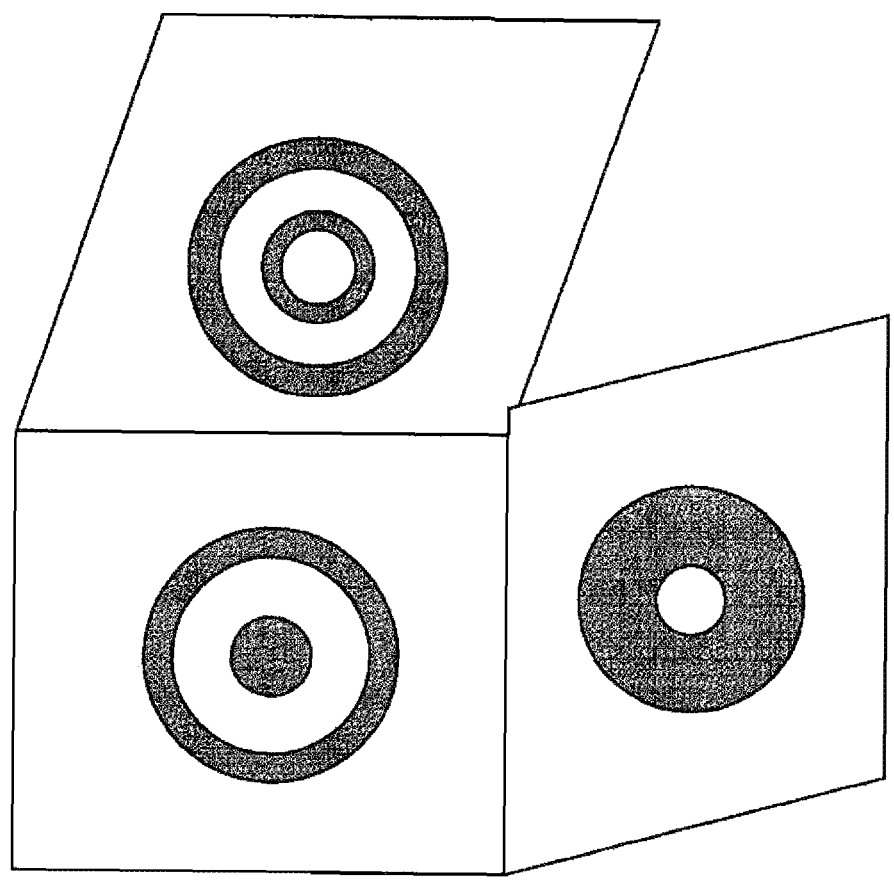
FIG. 11B illustrates concentric circles indicated on the hexahedron.

As shown in FIGS. 11A and 11B, the object 130 may be a hexahedron. In other words, the object 130 may have six faces. Some (e.g. 3) of the six faces may be a front face viewed in the direction of the first mirror 110, and the remaining of the six faces may be a rear face viewed in the direction of the second mirror 120.

FIG. 11B illustrates concentric circles indicated in the hexahedron.

FIG. 11B illustrates concentric circles indicated on the front or rear face of the hexahedral object 130 illustrated in FIG. 11A. Concentric circles may also be indicated on the face opposite to the face shown in FIG. 11B. Therefore, the object 130 may be a hexahedron having respective faces on which concentric circles may be indicated.

The concentric circles indicated on the six faces of the hexahedron may have different features. The concentric circles indicated on the respective faces of the hexahedron have concentric, elements, which are identifiable from each other.

When the multiple cameras 140 capture an image, the processing unit 150 may identify respective concentric circles on the six faces through different features in the captured image. In other words, the concentric circles on the six faces may be distinguished from each other. Also, the concentric circles on the six faces may be formed at different locations on surfaces that are different from each other in three dimensions.

Further, examples of the hexahedron and the object 130 indicated on the hexahedron may have a radius smaller than that of the objects 130 described in other embodiments.

As described above with reference to the embodiments, the object 130 may be produced in various manners. The components of the object 130 may have a geometric relationship therebetween. Such a geometric relationship may be a key in calibrating the multiple cameras 140, and the number of capturing operations by the multiple cameras 140 may be reduced.

Figure 12:
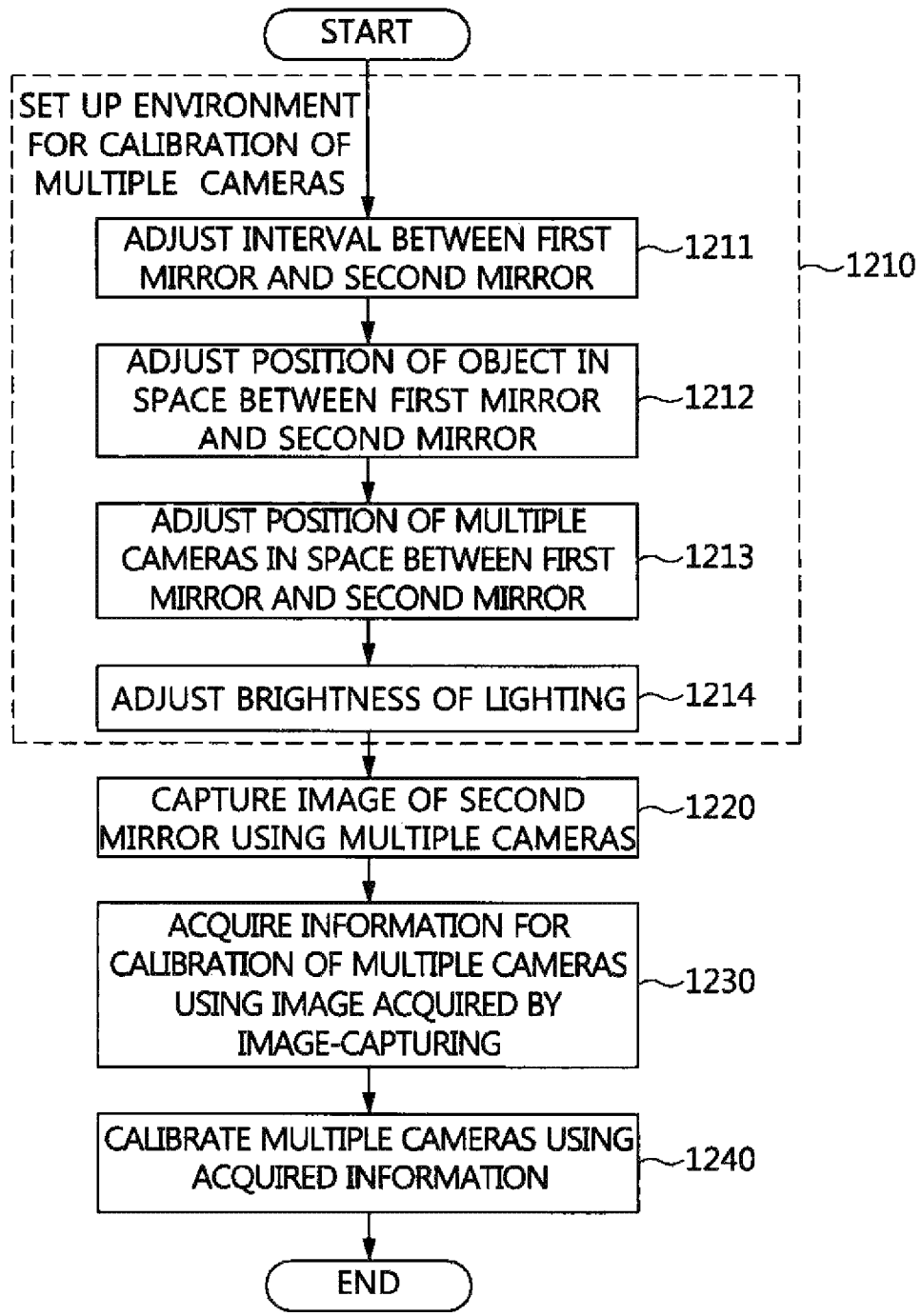
FIG. 12 is a flowchart showing a method for calibrating multiple cameras according to an embodiment.

FIG. 12 is a flowchart showing a method for calibrating multiple cameras according to an embodiment.

At step 1210, the apparatus 100 for calibrating multiple cameras may set up an environment for the calibration of the multiple cameras 140.

Step 1210 may include steps 1211, 1212, 1213, and 1214.

At step 1211, an interval between the first mirror 110 and the second mirror 120 may be adjusted.

The first mirror motion stage 119 and the second mirror motion stage 129 are movable. The interval between the first mirror 110 and the second mirror 120 may be adjusted by the movement of the first mirror motion stage 119 and the second mirror motion stage 129.

Further, the angles, directions, and postures of the first mirror 110 and the second mirror 120 may be adjusted by the first mirror motion stage 119 and the second mirror motion stage 129.

At step 1212, the position of the object 130 in space between the first mirror 110 and the second mirror 120 may be adjusted.

The object motion stage 139 is movable. The position of the object 130 in the space between the first mirror 110 and the second mirror 120 may be adjusted via the movement of the object motion stage 139.

Also, the angle, direction, and posture of the object 130 may be adjusted by the object motion stage 139.

At step 1213, the position of the multiple cameras 140 in the space between the first mirror 110 and the second mirror 120 may be adjusted.

The multiple-camera motion stage 149 is movable. The position of the multiple cameras 140 in the space between the first mirror 110 and the second mirror 120 may be adjusted by the movement of the multiple camera motion stage 149.

Alternatively, the multiple cameras 140 may be carried through a conveyer belt. The conveyer belt enables the multiple cameras to be sequentially located at predefined positions. The multiple-camera motion stage 149 enables the multiple cameras 140 located at the predefined positions to be disposed in the space between the first mirror 110 and the second mirror 120.

The angle, direction, and posture of the multiple cameras 140 may be adjusted by the multiple-camera motion stage 149.

At step 1214, the brightness of the lighting of the apparatus 100 for calibrating the multiple cameras may be adjusted.

The sequence of the above-described steps 1211, 1212, 1213 and 1214 is merely exemplary, and the sequence of execution of the steps may be randomly changed.

The environment suitable for the purpose of the multiple cameras 140 may be set up by the above-described steps 1211, 1212, 1213, and 1214, and the images suitable for the purpose of the multiple cameras 140 may be generated through the setup of the environment.

In setup of the environment, the attributes of the multiple cameras 140 may be taken into consideration. For example, when the baseline of the multiple cameras 140 is great, there may be a limitation in adjusting the distance between the multiple cameras 140 and the object 130. In this case, the angles of the first mirror 110 and the second mirror 120 may be adjusted, and the distance between the first mirror 110, the second mirror 120, and the object 130 may be adjusted.

In the process for manufacturing the multiple cameras 140, the structures of the multiple cameras may be identical. Therefore, an automatic adjustment method suitable for the characteristics of the multiple cameras 140 may be used.

For example, the characteristics of the multiple cameras 140 may include a view angle.

The light source 190 may allow the adjustment of the intensity of light emitted from the light source 190.

When vibration or the like caused by movement disappears, the multiple cameras 140 may capture an image of the second mirror.

At step 1220, the image of the second mirror may be captured by the multiple cameras 140. Here, the image-capturing of the second mirror 120 may mean that a figure or figures) of the object 130 formed on the second mirror 120 is captured.

The multiple cameras 140 may generate an image by capturing the image of the second mirror 120.

At step 1230, the multiple cameras 140 or the processing unit 150 may acquire information required for the calibration of the multiple cameras 140 using the image acquired via image-capturing.

The information required for calibration of the multiple cameras 140 may include intrinsic parameters and/or extrinsic parameters of each of the multiple cameras.

The multiple cameras 140 or the processing unit 150 may acquire the information required for the calibration of the multiple cameras 140 using various image processing algorithms and/or camera parameter acquisition methods.

The multiple cameras 140 or the processing unit 150 may identify components of the object 130 in each image.

For example, in the case of the object 130 in the embodiments described above with reference to FIGS. 9A, 9B, and 9C, nine circles are indicated on a single surface, and surfaces have their own unique directions. Also, symbols indicating a relative relationship between the surfaces are indicated. The multiple cameras 140 or the processing unit 150 may identify the components of the object 130 using a concentric circle detection algorithm and a surface relative relationship detection algorithm.

The multiple cameras 140 or the processing unit 150 may acquire information for the calibration of the multiple cameras 140 by applying an image processing algorithm to the identified components.

For example, in the case of the object 130 in the embodiments described above with reference to FIGS. 9A, 9B, and 9C, each of the front face and the rear face thereof has five or more surfaces. Therefore, information for the calibration of the multiple cameras 140 may be acquired by performing step 1220 and step 1230 only once.

For example, in the case of the object 130 in the embodiment described above with reference to FIG. 10, the characteristics of the image captured by the multiple cameras 140 indicate only small spheres. Therefore, the multiple cameras 140 or the processing unit 150 may detect the features of the image using a relatively simple image processing algorithm.

Further, via the reflection from the first mirror 110 and the second mirror 120, an object that is located farther may be simulated. By the simulation, the image suitable for the purpose of the multiple cameras 140 may be acquired.

Steps 1220 and 1230 may be repeatedly performed. For example, steps 1220 and 1230 may be repeated one or more times until information sufficient for the calibration of the multiple cameras 140 is acquired.

At step 1240, the multiple cameras 140 or the processing unit 150 may perform the calibration of the multiple cameras 140 using the acquired information.

For example, the multiple cameras 140 or the processing unit 150 may perform the calibration of the multiple cameras 140 by inputting the acquired information to the multiple cameras 140.

The apparatus described herein may be implemented using hardware components, software components, or a combination thereof. For example, the device and components described in the embodiments may be implemented using one or more general-purpose or special purpose computers, for example, a processor, a controller, an arithmetic logic unit (ALU), a digital signal processor; a microcomputer, a field programmable array (FPA), a programmable logic unit (PLU), a microprocessor or any other device capable of responding to and executing instructions. The processing device may run an operating system (OS) and one or more software applications that run on the OS. The processing device may also access, store, manipulate, process, and create data in response to execution of the software. For convenience of understanding, the use of a single processing device is described, but those skilled in the art will understand that a processing device may comprise multiple processing elements and multiple types of processing elements. For example, a processing device may include multiple processors or a single processor and a single controller. Also, different processing configurations, such as parallel processors, are possible.

The software may include a computer program, code, instructions, or some combination thereof, and it is possible to configure processing devices or to independently or collectively instruct the processing devices to operate as desired. Software and data may be embodied permanently or temporarily in any type of a machine, a component, physical or virtual equipment, a computer storage medium, a device, or in a propagated signal wave in order to provide instructions or data to the processing devices or to be interpreted by the processing devices. The software may also be distributed in computer systems over a network such that the software is stored and executed in a distributed method in particular, the software and data may be stored in one or more computer readable recording media.

The methods according to the above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

As described above, there are provided a calibration apparatus and method that can be used in a manufacturing process for multiple cameras.

There are provided a calibration apparatus and method that can provide high maintenance characteristics and can decrease installation expenses in a manufacturing process for multiple cameras.

There are provided an apparatus and method that can secure high calibration quality using only a small number of capturing operations by exploiting mirrors and objects.

The volume of an apparatus required for capturing may be reduced by exploiting mirrors, objects, and motion stages.

There are provided an apparatus and method that use individually operated motion stages for mirrors, objects, and multiple cameras.

Although the preferred embodiments have been disclosed based on a limited number of embodiments and drawings, those skilled in the art will appreciate that various modifications, additions and substitutions are possible. For example, even if the above-described technologies are performed in a sequence differing from that of the described method, and/or components such as a system, a structure, a device, and a circuit are coupled or combined in a way differing from that of the described method or are replaced with or substituted by other components or equivalents, suitable results can be achieved.

What is claimed is:

1. An apparatus for calibrating multiple cameras, comprising:
   a first mirror;
   a second mirror arranged opposite the first mirror; and
   an object disposed between the first mirror and the second mirror,
   wherein multiple cameras are calibrated using a figure of the object formed on the second mirror via reflection from the first mirror and the second mirror,
   wherein the object has a first shape viewed in a direction of the first mirror and a second shape, which is different from the first shape, viewed in a direction of the second mirror, and
   when a figure of the first shape and a figure of the second shape are repeatedly indicated in an image acquired when the multiple cameras capture the image of the second mirror, calibration of the multiple cameras is applied using the figure of the first shape and the figure of the second shape.

2. The apparatus of claim 1, wherein each of the first mirror and the second mirror is a reflection mirror.

3. The apparatus of claim 1, wherein the first mirror and the second mirror are arranged parallel to each other.

4. The apparatus of claim 1, wherein the first mirror has flatness equal to or greater than a predefined first threshold, and the second mirror has flatness equal to or greater than a predefined second threshold.

5. The apparatus of claim 1, wherein the object includes a combination of a plurality of points having a relative geometric relationship therebetween.

6. The apparatus of claim 1, wherein the object has a plurality of faces,
   at least some of the plurality of faces have different colors or contours from each other.

7. The apparatus of claim 1, wherein the object has a plurality of faces, and
   at least some of the plurality of faces have different numbers or symbols from each other.

8. The apparatus of claim 1, wherein the object has a plurality of faces, and
   a part of the plurality of faces corresponds to a front face viewed in a direction of the first mirror, and a remaining part of the plurality of faces corresponds to a rear face viewed in a direction of the second mirror.

9. The apparatus of claim 8, wherein the object is configured such that a pattern of points indicated on the front face is identical to a pattern of points indicated on the rear face, and a character indicated on the front face is different from a character indicated on the rear face.

10. The apparatus of claim 8, wherein each of the front face and the rear face includes five or more surfaces.

11. The apparatus of claim 1, wherein:
    at least one of the first shape or second shape has a pattern or a character that is viewed in the direction of only one mirror between the first and second mirror.

12. The apparatus of claim 1, wherein shapes in the image are classified into the first shape and the second shape, thus enabling overlapping figures in the image to be distinguished from each other.

13. The apparatus of claim 1, wherein the multiple cameras are arranged towards the second mirror.

14. The apparatus of claim 1, wherein a distance between the multiple cameras and the object, suitable for a purpose of use of the multiple cameras, is simulated using a distance between the first mirror and the second mirror and a distance between the second mirror, the object, and the multiple cameras.

15. The apparatus of claim 1, wherein calibration of the multiple cameras is performed using a region of interest in an image captured by the multiple cameras.

16. The apparatus of claim 15, wherein the region of interest is a region, brightness of which is equal to or greater than a predefined level, in the captured image.

17. The apparatus of claim 15, further comprising a light source for adjusting a size of the region of interest by adjusting an amount of emitted light.

18. The apparatus of claim 1, further comprising:
    a first mirror motion stage configured to adjust a position of the first mirror;
    a second mirror motion stage configured to adjust a position of the second mirror;
    an object motion stage configured to adjust a position of the object; and
    a multiple-camera motion stage configured to adjust a position of the multiple cameras.

19. A method for calibrating multiple cameras, comprising:
    setting up an environment for calibration of multiple cameras;

capturing an image of a second mirror using the multiple cameras, thus generating the image;

acquiring information for calibration of the multiple cameras using the image; and performing calibration of the multiple cameras using the acquired information, wherein a first mirror and the second mirror are arranged opposite each other, and wherein the image indicates a figure of an object formed on the second mirror via reflection from the first mirror and the second mirror, wherein the object has a first shape viewed in a direction of the first mirror and a second shape, which is different from the first shape, viewed in a direction of the second mirror, and when a figure of the first shape and a figure of the second shape are repeatedly indicated in an image acquired when the multiple cameras capture the image of the second mirror, calibrating the multiple cameras using the figure of the first shape and the figure of the second shape.

20. A method for calibrating multiple cameras, the method being performed by multiple cameras disposed between a first mirror and a second mirror, the method comprising:

capturing an image of the second mirror, thus generating the image;

acquiring information for calibration using the image; and performing calibration using the acquired information, wherein the first mirror and the second mirror are arranged opposite each other, and wherein the image indicates a figure of an object formed on the second mirror via reflection from the first mirror and the second mirror, wherein the object has a first shape viewed in a direction of the first mirror and a second shape, which is different from the first shape, viewed in a direction of the second mirror, and when a figure of the first shape and a figure of the second shape are repeatedly indicated in an image acquired when the multiple cameras capture the image of the second mirror, calibrating the multiple cameras using the figure of the first shape and the figure of the second shape.

* * * * *